UNITED STATES PATENT OFFICE.

JOHANN BAMMANN AND WALTER VORSTER, OF ELBERFELD, GERMANY, ASSIGNORS TO THE FARBENFABRIKEN OF ELBERFELD COMPANY, OF NEW YORK.

DINAPHTHYLAMIN SULFO DERIVATIVE AND PROCESS OF MAKING SAME.

SPECIFICATION forming part of Letters Patent No. 649,714, dated May 15, 1900.

Application filed February 17, 1900. Serial No. 5,601. (Specimens.)

*To all whom it may concern:*

Be it known that we, JOHANN BAMMANN and WALTER VORSTER, doctors of philosophy, chemists, (assignors to the FARBENFABRIKEN OF ELBERFELD COMPANY, of New York,) residing at Elberfeld, Germany, have invented a new and useful Improvement in Dinaphthylamin Compounds; and we hereby declare the following to be a clear and exact description of our invention.

Our invention relates to the production of a new sulfo derivative of beta-dinaphthylamin having the following formula:

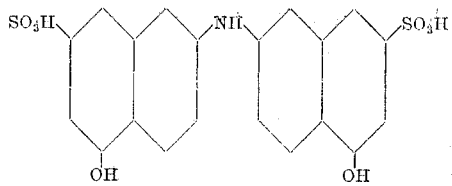

The process for producing this body consists in heating beta$_1$-amido-alpha$_3$-naphthol-beta$_4$-monosulfonic acid with a watery solution of sodium bisulfite. The new reaction proceeds as follows: A condensation of two molecules of the above-named oxynaphthylamin sulfonic acid takes place under evolution of one molecule of ammonia, the above-defined beta-dinaphthylamin derivative being thus formed according to the following equation:

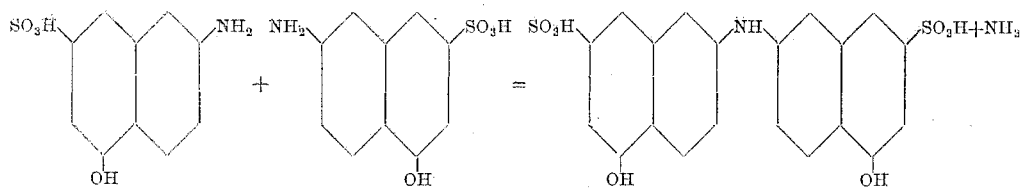

The dinaphthylamin compound thus obtained may be employed for the manufacture of valuable azo dyestuffs.

In carrying out our new process practically we can proceed as follows, (the parts being by weight:) A mixture prepared from two hundred parts of beta$_1$-amido-alpha$_3$-naphthol-beta$_4$-monosulfonic acid and two hundred parts of hot water is dissolved in caustic soda lye. In a vessel lined with lead and provided with a stirrer and a reflux condenser the solution thus obtained is mixed with seven hundred parts of a sodium-bisulfite solution of 33° Baumé and then heated at from 80° to 100° centigrade until a diluted test portion when mixed with an excess of hydrochloric acid (even when allowed to stand for a while) is found to yield no longer a precipitate of beta$_1$-amido-alpha$_3$-naphthol-beta$_4$-sulfonic acid. Subsequently the reaction mixture is strongly acidulated by means of hydrochloric acid. On cooling a large quantity of a crystalline nearly-white mass separates. It is filtered off, dissolved in a small quantity of water, and again precipitated by the addition of an excess of hydrochloric acid. The new dioxydinaphthylamin-disulfonic acid thus produced forms white needles. It has the above-given formula. The free acid as well as the alkaline salts thereof are very readily soluble in water. The dioxydinaphthylamin disulfonic acid thus obtained is capable of combining with one and likewise with two molecules of diazo compounds. On the addition of a small quantity of a watery solution of ferric chlorid to its watery solution a stable yellowish-orange color is produced, while a dirty yellowish-brown precipitate is obtained on the addition of more ferric chlorid. With a small quantity of a watery solution of bleaching-powder a reddish-orange color is formed, which quickly turns into a slight yellow. If an excess of the watery solution of bleaching-powder is employed, a dirty-brown color is obtained, which quickly turns into olive-brown. After a short while the liquid becomes clear and assumes then a yellowish-orange color.

Having now described our invention and in what manner the same is to be performed, what we claim as new, and desire to secure by Letters Patent, is—

1. The process for producing a new beta-dioxydinaphthylamin disulfonic acid by first dissolving a mixture of $\beta_1$-amido-$\alpha_3$-naphthol-$\beta_4$-monosulfonic acid and water in caustic alkaline lye, secondly heating the solution thus obtained with a sodium-bisulfite solution and finally isolating the resulting dinaphthylamin derivative, substantially as hereinbefore described.

2. As a new article of manufacture the $\beta_1$-dinaphthylamin-$\alpha_3$-dioxy-$\beta_4$-disulfonic acid having the formula:

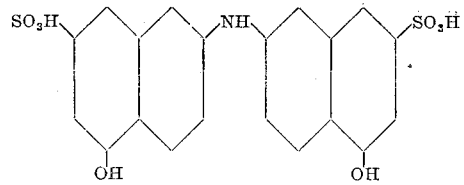

which is a whitish crystalline substance, very readily soluble in water and capable of combining with one and likewise with two molecules of diazo compounds, substantially as described before.

In testimony whereof we have signed our names in the presence of two subscribing witnesses.

JOHANN BAMMANN.
WALTER VORSTER.

Witnesses:
  OTTO KÖNIG,
  F. A. RITTERSHAUS.